Sept. 16, 1958  W. R. SHAFFER  2,852,305
ROAD MARKING APPARATUS
Filed Oct. 19, 1956

INVENTOR
William R. Shaffer,
BY Karl W. Flocks
ATTORNEY

United States Patent Office 2,852,305
Patented Sept. 16, 1958

2,852,305

ROAD MARKING APPARATUS

William R. Shaffer, Huntingdon, Pa., assignor to Wald Industries, Inc., Huntingdon, Pa., a corporation of Pennsylvania Application October 19, 1956, Serial No. 617,055

11 Claims. (Cl. 299—25)

The present invention relates to apparatus for controlling the operation of a road marking device. More particularly, the present invention relates to electrical apparatus that includes a photoelectric cell control unit that is adapted to control the operation of paint striping equipment, wherein an interrupted or solid line, or a combination of both, is accurately applied to the surface of a highway or road.

In applying highway markings, such as center stripes to roadways, it is the usual practice to employ self-propelled striping equipment. Prior to the instant invention, the heretofore known self-propelled striping equipment normally included mechanical means for controlling the operation of a paint gun which applied the striping material to the road surface. The mechanical control means usually included a cam of predetermined design that was responsive to the forward movement of the striping machine and controlled the operation of the paint gun, whereby an interrupted or intermittent paint line was applied to the road surface in accordance with the cam design.

It has been found in practice that it is desirable during the striping operation to not only vary the striping cycle, that is, shorten or lengthen the painted or unpainted portions of the stripe, but to retrace existing lines. In the prior known striping machines, deviations from the normal striping cycle were difficult to control and required considerable skill on the part of the operator to effect.

In the heretofore striping machines, all adjustments for deviating from the usual striping cycle were accomplished by manually changing the drive components, or by physically adjusting the position of the cam that controlled the operation of the paint gun distributing valve. In retracing existing lines, the heretofore known road marking equipment had to be closely regulated and controlled in order to exactly retrace the original markings.

Although the prior known striping equipment has been found satisfactory for applying highway markings and for retracing existing road markings, the successful operation thereof depends to a large extent on the skill of the operator. Moreover, the mechanical components of the prior known striping machines were subject to excessive wear and had to be repaired or replaced at frequent intervals.

The present invention eliminates the prior known mechanical components and utilizes a photoelectric cell scanning system that not only enables the operator to exactly set the length of line to be marked, but easily and simply provides for any combination of line markings desired. Moreover, the present system, which also incorporates an endless tape having slots of predetermined length formed therein, enables the operator to reset the striping cycle at any given time, thereby providing for instantaneous control by the operator.

It is therefore an object of the present invention to provide striping apparatus that is simple to operate, accurate in operation, and instantaneously responsive to the control of the operator.

Another object of the present invention is to provide road striping apparatus that is controlled electrically.

Still another object of the present invention is to provide road striping apparatus which includes a photoelectric cell that is responsive to a tape of predetermined pattern for controlling the paint striping apparatus.

Still another object of the present invention is to provide a road marking device wherein the photocell system for controlling the application of the marking material is adapted to be reset to any position of the striping cycle, as desired.

Still another object of the present invention is to provide a road striping device wherein the striping cycle defining the interrupted line may be varied in accordance with existing conditions.

Still another object of the present invention is to provide road striping apparatus wherein existing paint lines can be accurately and positively retraced.

Other objects and the nature and advantages of the instant invention will be apparent from the following description taken in conjunction with the accompanying drawings, wherein.

The electrical striping control apparatus for controlling the line marking operation embodied herein is adapted to be utilized with any conventional striping machine and is particularly adaptable to the small vehicle-type of the self-propelled variety.

Figure 1:
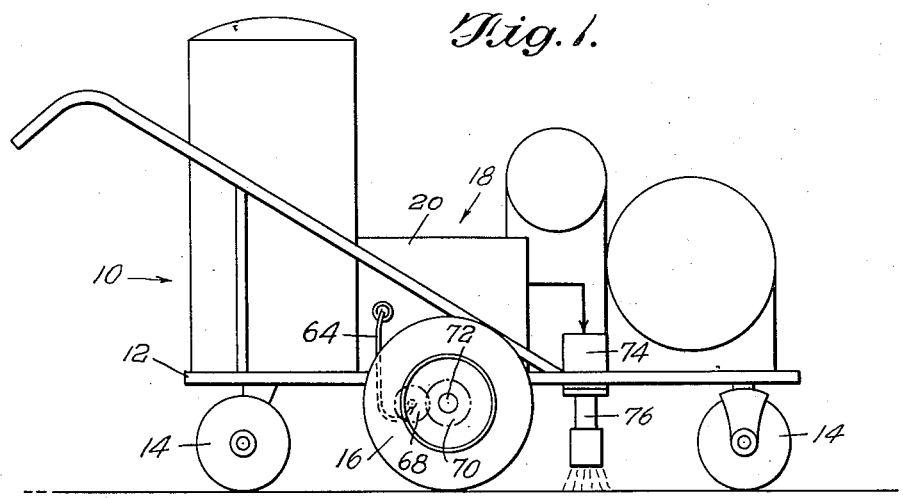
Fig. 1 is a side elevational view of a striping machine with which the present invention is utilized, the striping control apparatus being illustrated diagrammatically therein.

Referring now to the drawings, and particularly to Fig. 1, the striping control apparatus embodied in the present invention is shown mounted on a tri-wheeled self-propelled striping machine generally indicated at 10. The striping machine 10 includes a frame 12 upon which is mounted conventional equipment, such as the internal combustion engine, compressor, paint receptacle, etc. Rotatably mounted on axles fixed to the frame 12 are wheels 14 which define the tricycle wheel arrangement. A fourth or ground wheel 16 is also rotatably journalled on a hub secured to the frame 12, the ground wheel 16 being adapted to supply the motion for operating the intermittent striping mechanism, as will be described hereinafter. Mounted on the frame 12 and mechanically interconnected to the ground wheel 16 is the striping control apparatus generally indicated at 18 and shown enclosed in a suitable housing 20.

Figure 2:
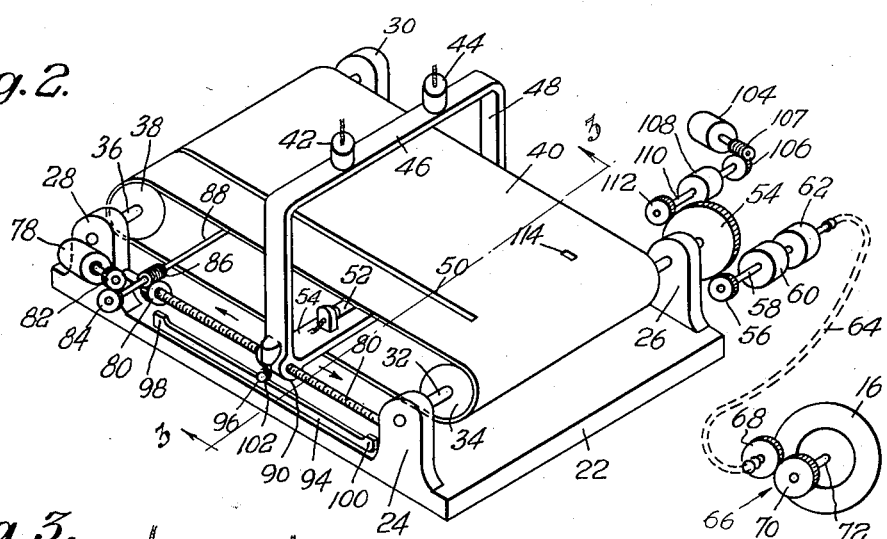
Fig. 2 is a perspective view in diagrammatic form of the apparatus embodied herein for controlling the application of the striping material.
Figure 3:
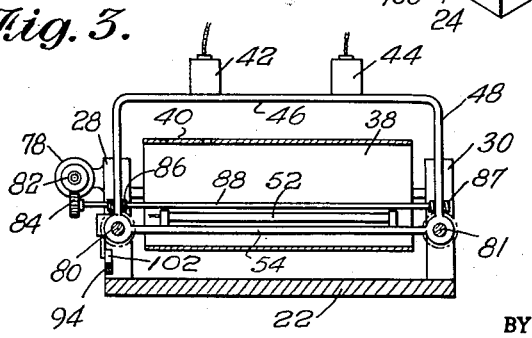
Fig. 3 is a sectional view taken along the line 3—3 of Fig. 2.

Referring now to Figs. 2 and 3, the striping control apparatus 18 is illustrated therein and includes a frame 22 upon which are mounted standards 24, 26 and 28, 30. Journalled in the standards 24, 26 is a drive shaft 32 that has a roll 34 secured thereto and adapted to rotate therewith. Similarly, the standards 32, 30 have a shaft 36 journalled therein, the shaft 36 having a roll 38 secured thereto for rotation therewith. Extending around the rolls 34, 38 in frictional engagement therewith is an endless tape 40 that is adapted to be moved in response to rotation of the rolls 34, 38.

In order to accurately control the striping operation, a photoelectric cell system is utilized and includes photocells 42 and 44. The photocells 42 and 44 are mounted on a cross arm 46 of a movable carriage 48, the cross arm extending laterally over the tape 40. The photocell 42 is offset from the center of the cross arm 46 and during the paint applying portion of the striping cycle is adapted to be positioned directly over a spray control slot 50 formed in the tape 40. The photocell 42 is adapted to be energized during the paint applying cycle by a light source 52 located on a lower cross arm 54 of the carriage 48, the light source 52 being positioned directly under photocell 42. The spray control slot 50 is of a predetermined length and determines the length of the painted portions of the intermittent stripe to be applied by the striping apparatus. It is seen that as the rolls 34 and 38 drive the endless tape 40, the spray control slot 50 will be moved out of register with the photocell 42 and light source 52, thereby causing the photocell 42 to be deenergized, as will be more completely described hereinafter. It is seen that several photocells could be used simultaneously and that several markings could be produced either simultaneously or separately, as desired.

The tape 40 is moved during the striping operation by rotation of the drive roll 34 and the drive during the normal striping cycle is effected by rotation of the drive shaft 32 to which the roll 34 is secured. Mounted on the outer end of the shaft 32 is a gear 54 which is engaged by a smaller gear 56. The gear 56 is secured to a shaft 58 that is driven by an over-run clutch 60 which in turn is mechanically interconnected to an electrically operated drive clutch 62. The electrically operated drive clutch 62 transfers the drive from a flexible cable drive 64 to the over-run clutch 60. The flexible cable is operatively connected to the ground wheel 16 through cycle control gearing generally indicated at 66. The cycle control gearing 66 may include any combination of gearing desired and, as shown, includes a gear 68 that is connected to the flexible cable 64 and a second smaller gear 70 that engages the gear 68. The gears 68 and 70 may be regulated manually to control the speed of rotation of the flexible cable, thereby controlling the speed of rotation of the shaft 32 and roll 34 secured thereto and adjusting for large changes in the required striping cycle. The speed of rotation of the tape 40 will be affected a corresponding amount, thereby varying the movement of the spray control slot and the spraying cycle. It is seen that the cycle control gearing will maintain a constant ratio between the ground wheel 16 and drive gear 54. Should the ground wheel wear or should the diameter thereof be changed, the cycle control gearing may be regulated to compensate somewhat for the variation. The small gear 70 is mounted on a shaft 72 that has the ground wheel 16 journalled for rotation on the end thereof and is therefore responsive to movement of the ground wheel 16 to drive the flexible shaft 64 through the gear 68.

In carrying out the striping operation, the photocell 42 is adapted to control the operation of a solenoid valve 74 (Fig. 1) or a solenoid operated spray gun which, in turn, controls the operation of a paint gun 76 mounted on the frame 12 of the striping machine 10. It is seen that as the photocell 42 is periodically energized by the light which is directed through the spray control slot from the light source 52, the paint gun 76 will be actuated and will direct a spray of paint onto the surface of the road being marked.

The striping control apparatus 18 is also adapted to control the spraying operation so that lines may be retraced or the striping cycle returned to a zero or start position at any time during the striping operation. In order to retrace existing lines a reversible motor 78 is provided and is mounted on the frame 22. The reversible motor 78 is operatively connected to lead screws 80 and 81 (Fig. 3) through gears 82 and 84 and worm gears 86, 87, the gears 84, 86 and 87 being mounted on a shaft 88 that is journalled for rotation in suitable standards fixed to the frame 22. The lead screw 80 threadably engages an internally threaded bore formed in an enlarged portion 90 which is formed integral with the carriage 48 and is adapted to move the carriage upon rotation thereof. The lead screw 81 (Fig. 3) is positioned on the opposite side of the frame 22 and threadably engages an internally threaded bore formed in an enlarged portion similar to the portion 90. The lead screw 81 is threadably engaged by the worm gear 87 that is fixed to the shaft 88. It is seen that rotation of the shaft of the motor 78 will cause the lead screws 80 and 81 to be rotated thereby moving the carriage 48 with respect to the tape 40. By moving the carriage 48 with respect to the tape, the striping cycle may be started at the point where the existing line is located. This operation will be described in more detail hereinafter.

In order to reset the striping apparatus to a zero position, an elongated control cam 94 is provided and is positioned directly under the lead screw 80, being mounted on pedestals that are fixed to the frame 22. The upper edge of the control cam 94 defines a cam surface and is formed with a groove 96 at the center thereof, and upstanding projections 98, 100 at the outer ends thereof. A spring mounted follower 102 is secured to the underside of the enlarged carriage portion 90 and is operatively connected to a control switch (not shown), that is electrically connected to the motor 78 and to a reset motor 104 that is adapted to drive the shaft 32. The reset motor is operatively connected to the shaft 32 through a gear 107 that drives an electrically operated over-run clutch 108, the clutch 108 driving a shaft 110 to which is secured a gear 112. The gear 112 engages the drive gear 54 that is secured to the drive shaft 32 and is adapted to transfer the drive from the motor 104 to the tape 40. The reset motor 104 is energized by suitable switching for moving the tape 40 to the zero striping position and is deenergized when a reset opening 114 formed in the tape 40 is moved into alignment with the photocell 44. The photocell 44 is then energized and is put in the reset motor circuit to deenergize the reset motor. At this point, the tape is located in position to repeat the striping cycle. The striping cycle, which is determined by the length of the spray control slot 50 and the rotational speed of the ground wheel 16, will repeat continuously as the striping machine moves over the surface being marked.

Referring to Fig. 2, the operation of the device embodied in the present invention will now be described. With the striping machine in motion, the electrical circuit controlling the current to the light source, electric clutch 62, photoelectric cell 42 and the solenoid valve 74 is closed. The drive shaft 32 is then driven by the ground wheel 16 through the cycle control gearing 66, flexible cable 64, electric clutch 62, over-run clutch 60, shaft 58 and gears 56 and 54. The drive roll 34 is thus rotated to drive the tape 40. The tape 40 is advanced and the spray control slot 50 is moved under the photocell 42. The photocell circuit is then energized and actuates the solenoid valve 74, thereby causing the spray gun 76 to begin the spraying operation. The spraying operation continues as the unit travels over the surface being marked.

It is seen that during the normal operation of the device, the striping control apparatus controls the striping operation in response to rotation of the ground wheel 16. The reset motor 104 is prevented from being rotated, and thus damaged, by the over-run clutch 108, and the over-run clutch 60, which is operatively connected to the drive shaft 32, is adapted to prevent damage to the mechanism if the ground wheel is rotated in a reverse direction when, for example, the striping machine is backing up. It is understood that during any reverse movement of the machine, the striping control apparatus 18 is inoperative and the striping operation is interrupted.

Assuming now that an existing line or series of lines are to be retraced, the cycle of operation is substantially as that described above. However, it is seen that the striping cycle will probably not begin at the same point as the line being retraced. In this event, the motor 78 is energized and rotated in the desired direction which causes the lead screws 80 and 81 to be rotated. Rotation of the lead screws 80, 81 causes the carriage 48 to be moved either forwardly or rearwardly, depending on the direction of rotation of the motor 78, thereby moving the light source 52 and the photocell 42 until the end of the spray control slot is reached. The solenoid valve 74 is then energized which then actuates the spray gun 76 to begin the spraying cycle. At this point, the motor 78 is automatically cut off. Limit switches (not shown) are located at each end of the lead screws 80, 81 and thereby prevent over-travel of the mechanism as the carriage 48 is moved in response to the rotation of the motor 78.

It is frequently desirable to reset the control mechanism to a zero position, for example, when the striping machine is moved to a new location and the striping cycle is to be started from the beginning. To reset the mechanism, the electrical circuit to the electric clutch 62 is broken, thereby disengaging the drive from the ground wheel 16, which then rotates free of the striping control mechanism 18. The reset motor 104 is energized which drives the roll 34 through the clutch 108, shaft 110, gears 112 and 54 and shaft 32. The tape 40 is thus moved by the reset motor 104 and is adapted to be moved in a direction opposite to that in which it would normally move. The reset opening 114 is accordingly moved to the point where it will be positioned directly under the reset photocell 44.

When the striping control apparatus is at the reset or zero position, the carriage 48 is located at a central or reset position. The central position of the carriage 48 is determined by the positioning of the follower 102 in the central detent or groove 96 formed in the elongated control cam 94. In order to move the follower 102, which is secured to the enlarged portion 90 of the carriage 48, into the groove 96, the motor 78 is energized and the lead screws 80, 81 rotated, thereby moving the carriage 48. The motor 78 will move the carriage 48 until the follower 102 engages the groove 96, at which time the switch associated with the follower will be actuated to cut off the motor 78. If the carriage is moved in the first instance away from the central position, the follower 102 will engage either projection 98 or 100 which will move the follower switch to a position whereby the motor 78 is reversed. The carriage 48 will then be reversed and will move toward the central position until the follower 102 engages the groove 96. The reset motor 104, in the meantime, continues to operate and continues to drive the tape 40 until the reset opening 114 is in alignment with the photocell 44 and the associated light source. The reset motor is then deenergized and the tape is located in the zero or reset position and the striping cycle may be begun by energizing the electric clutch 62, the circuit to the photocell 42 and the light source 52.

It will be obvious to those skilled in the art that various changes may be made without departing from the spirit of the invention and therefore the invention is not limited to what is shown in the drawings and described in the specification, but only as indicated in the appended claims.

What is claimed is:

1. In apparatus for controlling the operation of a paint gun, a frame, an endless tape mounted on said frame and having a control slot formed therein of predetermined length, an upper cross arm mounted on said frame, a photocell secured to said upper cross arm and disposed over said endless tape, a lower cross arm mounted on said frame and operatively connected to said upper cross arm, a light source secured to said lower cross arm and adapted to be directed toward said photocell through said slot, and means mounted on said frame for moving said endless tape to cause said photocell to be periodically energized as said light source is directed through said slot.

2. In road marking apparatus, a frame, light responsive means mounted on said frame, means mounted on said frame and spaced from said light responsive means for energizing said light responsive means, an endless tape interposed between said light responsive means and said energizing means and having a slot of predetermined length formed therein for causing said light responsive means and energizing means to register periodically, said light responsive means thereby being periodically energized to effect an intermittent control on said road marking apparatus.

3. In apparatus of the class described, the combination comprising a frame, light responsive means mounted on said frame, an endless tape movably mounted on said frame and having a slot formed therein of predetermined length, said endless tape being movable with respect to said light responsive means to cause said slot to periodically register with said light responsive means, and a light source mounted on said frame opposite said light responsive means and below said tape, said light responsive means being periodically energized by said light source as the slot in said endless tape periodically registers with said light source and light responsive means.

4. In control apparatus of the class described, the combination comprising a main frame, an endless tape mounted on said frame and having a control slot formed therein of predetermined length, a cross frame secured to said main frame, a photocell secured to said cross frame and positioned over said endless tape, a light source secured to said cross frame and positioned under said endless tape for directing a beam of light through said slot to said photocell, means mounted on said frame and operatively connected to said tape for moving said tape to cause said photocell to periodically register with said slot, whereby said light beam energizes said photocell, and means mounted on said frame and operatively connected to said cross frame for moving said cross frame with respect to said tape thereby varying the periodic energization of said photocell by said light source.

5. In apparatus for applying a marking to a surface, a wheeled vehicle, a paint gun mounted on said vehicle, and means carried by said vehicle for controlling the operation of said paint gun, whereby said paint gun applies an interrupted line to said surface, said controlling means including an endless tape having a spray control slot formed therein of predetermined length, a photocell electrically connected to said paint gun and operatively positioned with respect to said tape, a light source located below said tape and adapted to be directed toward said photocell through said slot, means mounted on said vehicle moving said tape in response to movement of said vehicle and causing said photocell to be periodically energized as said light source is directed through the slot formed in said tape, said paint gun thereby being actuated to apply an interrupted marking to said surface, and means mounted on said vehicle and operatively connected to said photocell varying the relative position of said photocell and said tape when an existing marking is to be retraced.

6. In apparatus for applying a marking to a surface, a wheeled vehicle, a paint gun mounted on said vehicle, and means carried by said vehicle for controlling the operation of said paint gun, whereby said paint gun applies an interrupted line to said surface, said controlling means including an endless tape having a spray control slot formed therein of predetermined length, a photocell electrically connected to said paint gun and operatively positioned with respect to said tape, a light source located below said tape and adapted to be directed toward said photocell through said slot, means mounted on said vehicle moving said tape in response to movement of said vehicle and causing said photocell to be periodically energized as said light source is directed through the slot formed in said tape, said paint gun thereby being actuated to apply an interrupted marking to said surface, and means mounted on said vehicle and operatively connected to said tape returning said tape to a zero position in the marking cycle for beginning the marking cycle at any given time.

7. In apparatus for applying an interrupted marking to a surface, a wheeled vehicle, paint generating means mounted on said vehicle, and means carried by said vehicle for controlling the operation of said paint generating means, said controlling means comprising a ground wheel mounted for rotation on said vehicle, and striping control apparatus mounted on said vehicle and operatively connected to said ground wheel, said striping control apparatus including a photocell electrically connected to said paint generating means and controlling the operation thereof, an endless tape located adjacent said photocell and having a slot of predetermined length formed therein, said slot defining the striping portion of the paint applying cycle, a light source located on the side of the tape opposite said photocell and being directed through said slot to energize said photocell when said slot is in register therewith, means operatively connected to said ground wheel for driving said endless tape during the striping operation, and means mounted on said vehicle and operatively connected to said photocell varying the relative position of said photocell and said tape when an existing marking is to be retraced.

8. In apparatus for applying an interrupted marking to a surface, a wheeled vehicle, paint generating means mounted on said vehicle, and means carried by said vehicle for controlling the operation of said paint generating means, said controlling means comprising a ground wheel mounted for rotation on said vehicle, and striping control apparatus mounted on said vehicle operatively connected to said ground wheel, said striping control apparatus including a photocell electrically connected to said paint generating means and controlling the operation thereof, an endless tape located adjacent said photocell and having a slot of predetermined length formed therein, said slot defining the striping portion of the paint applying cycle, a light source located on the side of the tape opposite said photocell and being directed through said slot to energize said photocell when said slot is in register therewith, means operatively connected to said ground wheel for driving said endless tape during the striping operation, and means mounted on said vehicle and operatively connected to said tape for returning said tape to a zero position in the marking cycle for beginning the marking cycle at any given time.

9. In road marking apparatus for applying an interrupted line to a surface, paint generating means, means for controlling the operation of said paint generating means, said controlling means including light responsive means electrically connected to said paint generating means, means for energizing said light responsive means, tape means interposed between said light responsive means and energizing means for causing them to register periodically, said light responsive means thereby being periodically energized to actuate said paint generating means whereby an interrupted marking is applied to said surface, means for varying the relative position of said light responsive means and tape means when an existing line is to be retraced, and means operatively connected to said tape means for moving said web means to a zero position in the marking cycle, said tape means thereby being located in position for beginning the marking cycle.

10. In road marking apparatus, a wheeled vehicle, paint generating means mounted on said wheeled vehicle, light responsive means mounted on said vehicle and electrically connected to said paint generating means, means mounted on said vehicle and spaced from said left responsive means for energizing said light responsive means, and movable means mounted on said vehicle and interposed between said light responsive means and energizing means and responsive to movement of said wheeled vehicle for causing said light responsive means and energizing means to register periodically, said light responsive means thereby being periodically energized to actuate said paint generating means whereby an interrupted marking is applied to a surface being marked, and means mounted on said vehicle for varying the relative positions of said light responsive means and movable means when an existing marking is to be retraced.

11. In road marking apparatus, a wheeled vehicle, paint generating means mounted on said wheeled vehicle, light responsive means mounted on said vehicle and electrically connected to said paint generating means, means mounted on said vehicle for energizing said light responsive means, movable means mounted on said vehicle interposed between said light responsive means and energizing means and responsive to movement of said wheeled vehicle for causing said light responsive means and energizing means to register periodically, said light responsive means thereby being periodically energized to actuate said paint generating means whereby an interrupted marking is applied to a surface being marked, and means mounted on said vehicle and operatively connected to said moving means returning said moving means to a zero position in the marking cycle for beginning the marking cycle at a predetermined position.

References Cited in the file of this patent

UNITED STATES PATENTS

| | | |
|---|---|---|
| 2,031,504 | Rainey | Feb. 18, 1936 |
| 2,281,169 | Pattison | Apr. 28, 1942 |
| 2,345,076 | Spencer | Mar. 28, 1944 |
| 2,754,795 | Enssle | July 17, 1956 |